(12) United States Patent
Krikorian et al.

(10) Patent No.: US 7,006,034 B1
(45) Date of Patent: Feb. 28, 2006

(54) FAST AND SLOW TIME SCALE CLUTTER CANCELLATION

(75) Inventors: Kapriel V. Krikorian, Calabasas, CA (US); Robert A. Rosen, Simi Valley, CA (US); Mary Krikorian, Calabasas, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 11/077,093

(22) Filed: Mar. 10, 2005

(51) Int. Cl.
*G01S 7/292* (2006.01)
*G01S 13/90* (2006.01)
*G01S 13/00* (2006.01)

(52) U.S. Cl. .................. 342/159; 342/25 R; 342/25 A; 342/25 F; 342/89; 342/91; 342/94; 342/175; 342/195; 342/196

(58) Field of Classification Search .... 342/25 R–25 F, 342/89–103, 159–164, 175, 192–197
See application file for complete search history.

(56) References Cited

U.S. PATENT DOCUMENTS

| | | | | |
|---|---|---|---|---|
| 3,735,400 A | * | 5/1973 | Sletten et al. | 342/161 |
| 3,882,498 A | * | 5/1975 | McGuffin | 342/91 |
| 3,993,994 A | * | 11/1976 | Goggins | 342/25 B |
| 4,068,231 A | * | 1/1978 | Wilmot | 342/91 |
| 4,086,590 A | * | 4/1978 | Goggins, Jr. | 342/25 B |
| 4,488,154 A | * | 12/1984 | Ward | 342/162 |
| 4,825,213 A | * | 4/1989 | Smrek | 342/25 B |
| 4,924,229 A | * | 5/1990 | Eichel et al. | 342/25 E |
| 5,113,193 A | * | 5/1992 | Powell et al. | 342/25 F |
| 5,160,931 A | * | 11/1992 | Brown | 342/25 C |
| 5,563,601 A | * | 10/1996 | Cataldo | 342/25 A |
| 5,708,436 A | * | 1/1998 | Loiz et al. | 342/25 A |
| 6,166,678 A | * | 12/2000 | Jao | 342/25 A |
| 6,400,306 B1 | * | 6/2002 | Nohara et al. | 342/25 R |
| 6,603,424 B1 | * | 8/2003 | Abatzoglou | 342/25 R |
| 6,633,253 B1 | * | 10/2003 | Cataldo | 342/25 R |
| 6,697,010 B1 | * | 2/2004 | Lam | 342/25 R |

* cited by examiner

*Primary Examiner*—Bernarr E. Gregory
(74) *Attorney, Agent, or Firm*—Leonard A. Alkov; Karl A. Vick

(57) ABSTRACT

Target detection in the presence of non stationary clutter is improved by a radar receiver on a moving platform for detecting a target using a plurality of short coherent arrays and a plurality of long coherent arrays synthesized from the short coherent arrays overlapping the target. The target is obscured by slow scale clutter and fast scale clutter in the vicinity of the target. The radar receiver has a plurality of subapertures overlapping to acquire radar returns reflected from the target during the arrays, an analog to digital converter for each of the subapertures to convert the radar returns into digital radar returns for a plurality of range bins covering the target, the slow scale clutter and the fast scale clutter; and a digital computer for performing steps of SAR image creation, further enhanced by thresholding short array magnitude data, computing a time domain component of threshold filters using the thresholded short array magnitude data then coherently subtracting the time domain component of threshold filters from the short arrays, and using the result to synthesize long coherent arrays. A Space Time Adaptive Algorithm (STAP) is applied to the long coherent arrays thus obtained to suppress slow and stationary clutter. The short coherent arrays are between 10 and 400 milliseconds long. The long coherent arrays are between 400 and 4000 milliseconds long.

14 Claims, 5 Drawing Sheets

FAST AND SLOW TIME SCALE CLUTTER CANCELLATION

BACKGROUND OF THE INVENTION

1. Field of the Invention

This invention is in the field of non-stationary clutter cancellation for use with radar imaging and/or target detection.

2. Description of the Related Art

Synthetic Aperture Radar (SAR) radar is used for ground mapping as well as target identification. The general principle behind SAR is to coherently combine the amplitude and phase information of radar returns from a plurality of sequentially transmitted pulses from a relatively small antenna on a moving platform.

The plurality of returns creating a SAR image generated by the transmitted pulses along a known path of the platform make up an array. During the array, amplitude as well as phase information returned from each of the pulses, for each of many range bins, is preserved. The SAR image is formed from the coherent combination of the amplitude and phase of return(s) within each range bin, motion compensated for spatial displacement of the moving platform during the acquisition of the returns for the duration of the array.

The plurality of pulses transmitted during a SAR array, when coherently combined and processed, result in image quality comparable to a longer antenna, corresponding approximately to the "length" traveled by the antenna during the array.

However, where ground targets of interest are near a source of fast varying clutter, such as foliage on vegetation subject to turbulent wind, SAR imaging may not reliably detect or image the targets. Besides the desired target signal reflected from the target of interest, there are also returns from fast varying clutter, slowly varying clutter, and noise. In the prior at, lower operating frequencies (VHF and UHF) have been used to penetrate forest canopies. This is because VHF and UHF frequencies have lower attenuation through forest canopies or other vegetative cover, while still providing a radar return from metal, reflecting targets. However, this VHF and UHF frequency approach failed in many instances because of the effect of the Doppler shift induced in the SAR imaging by slow and fast clutter coupled to the presence of noise.

The fast varying nature of the clutter from vegetation modulates the Rayleigh distributed component of clutter, making the clutter non-stationary. This introduces uncertainty as to the Doppler of the clutter. Current Space Time Adaptive Algorithm (STAP) algorithms for clutter cancellation do not provide sufficient clutter rejection to allow imaging/detection in non-stationary clutter.

Similarly, in a maritime environment, radar returns from sea surface targets are obscured by fast varying clutter returns from small ocean waves and surf, as well as slow varying clutter from larger waves. Generally X band radar is used for maritime applications. As above, even with X band operation, the fast varying clutter modulates the slow varying, Rayleigh distributed component of clutter obscuring the target of interest.

Detection of slow moving targets within non-stationary clutter such as wind blown foliage or sea clutter is degraded because there is no definite correspondence between target angle and the Doppler shift of the clutter.

SUMMARY OF THE INVENTION

Target detection in the presence of non stationary clutter is improved by a radar receiver on a moving platform for detecting a target using a plurality of short coherent arrays and a plurality of long coherent arrays synthesized from said short coherent arrays, said plurality of short coherent arrays and said plurality of long coherent arrays overlapping over said target, said target obscured by a slow scale clutter and a fast scale clutter in the vicinity of said target. The radar receiver comprises:

a plurality of subapertures, each of said subapertures having receive patterns, said receive patterns overlapping to acquire radar returns reflected from said target during said plurality of short coherent arrays;

an analog to digital converter for each of said subapertures to convert the radar returns into digital radar returns for a plurality of range bins, the range bins covering the target, the slow scale clutter and the fast scale clutter during said plurality of short coherent arrays a digital computer for performing the steps of:

motion compensating said digital radar returns derived from each of said plurality of subapertures during said plurality of short coherent arrays for said plurality of range bins, with respect to said target, to obtain a plurality of short array focused data of said target obscured by said slow scale clutter and said fast scale clutter, for each of said subapertures;

integrating said short array focused data for each of said subapertures over said plurality of short array focused data to obtain short array integrated data for each range bin of said plurality of range bins;

computing magnitude of Doppler filters, typically using an FFT, for each range bin of said plurality of range bins from said short array integrated data to obtain short array magnitude data;

comparing said short array magnitude data with a threshold for each range bin of said plurality of range bins, and setting said short array magnitude data for said range bins for each range bin of said plurality of range bins below said threshold to zero to obtain thresholded data;

computing a time domain component of threshold filters using said thresholded data for each range bin of said plurality of range bins;

coherently subtracting said time domain component of threshold filters from said short array integrated data to obtain a fast scale clutter corrected data.

Fast scale clutter corrected data is synthesized to form said long coherent arrays to obtain fast scale corrected data thereby eliminating said fast scale clutter. A Space Time Adaptive Algorithm (STAP) is applied to compressed data extracted from the fast scale corrected data.

The threshold is computed using a short array variance of said short array magnitude data.

The fast scale clutter corrected data is processed using acceleration matched filtering for use with the Space Time Adaptive Algorithm (STAP).

The short coherent arrays are between 10 and 400 milliseconds long. The long coherent arrays synthesized from a plurality of fast scale clutter corrected data are between 400 and 4000 milliseconds long.

DETAILED DESCRIPTION OF THE INVENTION

The present invention describes an apparatus and method for canceling the effects of non-stationary clutter on SAR images of targets located in the proximity of foliage related clutter and/or maritime clutter from small waves and surf.

Figure 1:
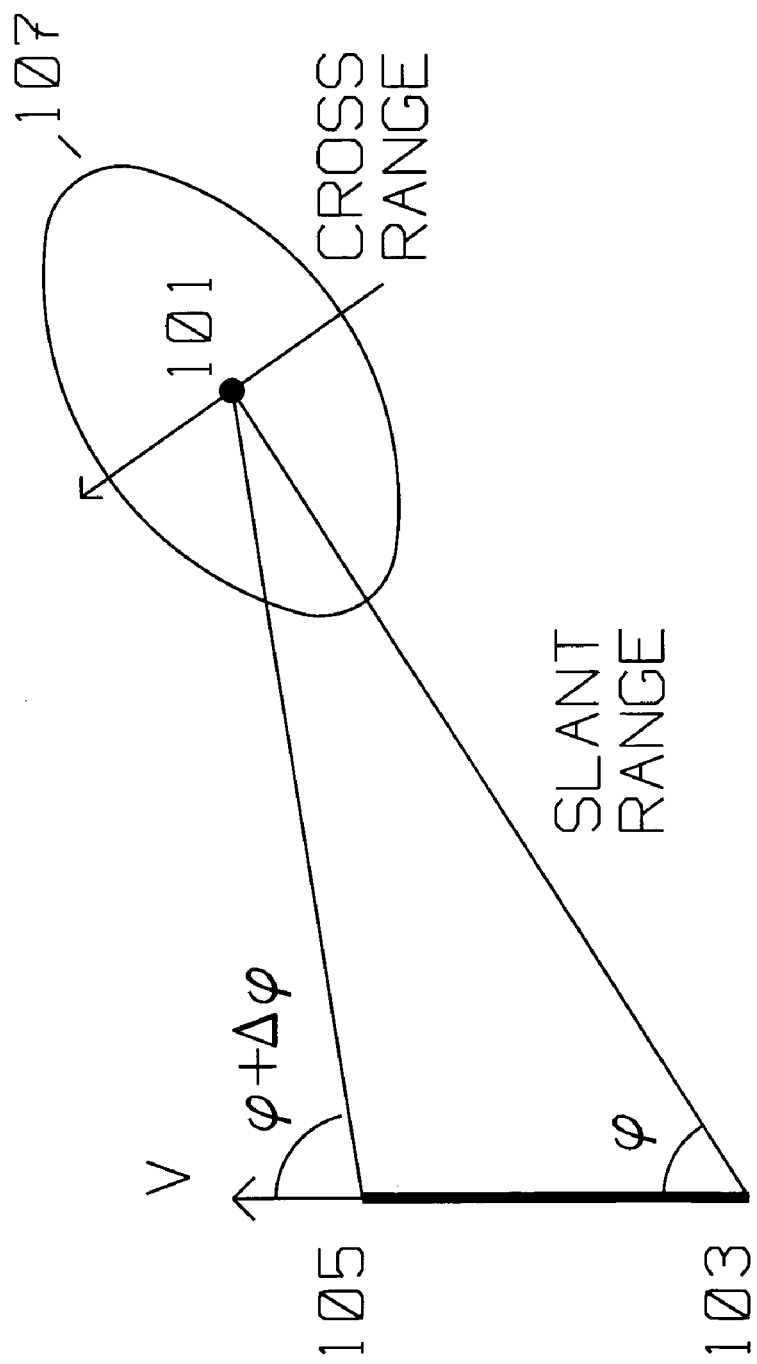
FIG. 1 is a SAR spotlight configuration of the prior art.

FIG. 1 shows the typical prior art geometric relationship between a moving plat- form carrying a radar transmitter/receiver using Synthetic Aperture (SAR) spotlight methods and target area 101 to be imaged by said radar transmitter/receiver. The moving platform is initially at position 103, travels with velocity V in the direction shown to position 105. In SAR spotlight mode, the SAR antenna is actively oriented towards scatterer 101 as the platform moves with respect to scatterer 101 with velocity V. The moving platform moves from position 103 to position 105, while adjusting the side looking angle from $\phi$ to $\phi+\Delta\phi$ for spotlight mode so that the antenna keeps illuminating target area 101. Antenna illumination with radar energy covers area 107 during the array length, and includes target area 101. Similarly, the antenna receive pattern covers area 107, and includes target area 101. Radar pulses are transmitted and corresponding returns received at many points during the array (frame) length between position 103 and position 105. SAR radar is well known in the art and, for example, is described by W. Carrara, et al, in *Spotlight Synthetic Aperture Radar*, Artech house, 1995, incorporated herein be reference in its entirety.

Figure 2:
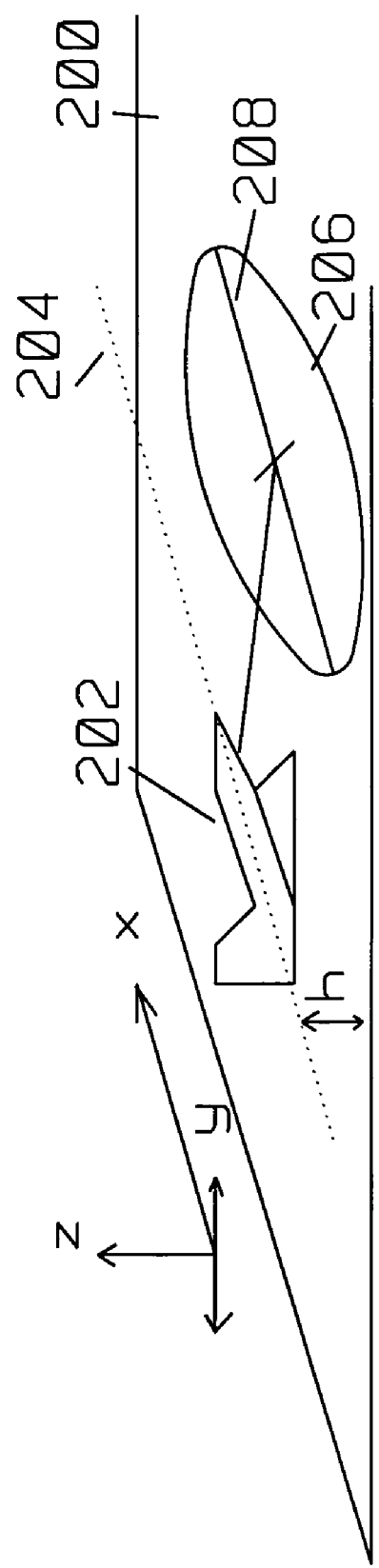
FIG. 2 shows a path of a moving platform (flying aircraft) defining an ideal, straight and level path along the centerline of a scene to be acquired for a SAR image.
Figure 3:
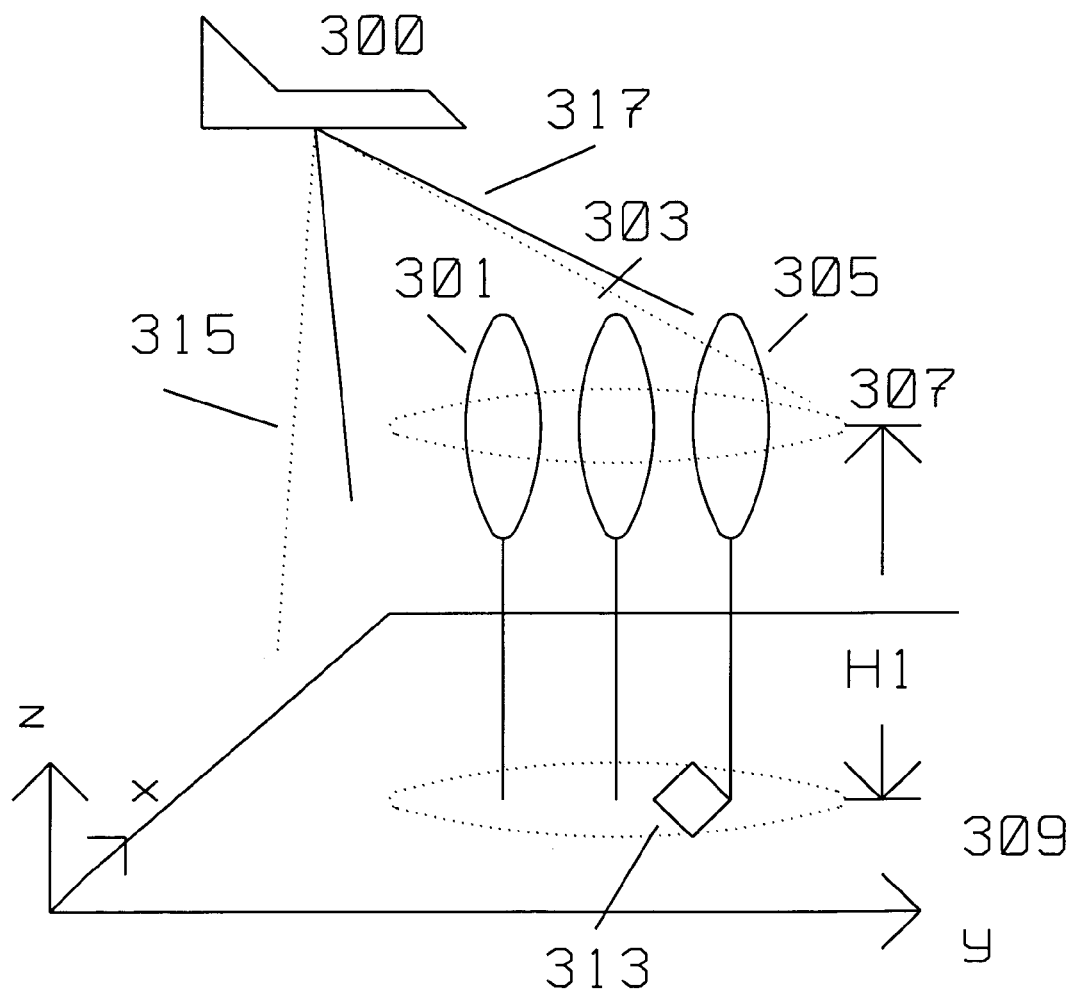
FIG. 3 shows a typical scene to be imaged where wind blown vegetation generated non-stationary clutter in the vicinity of the target of interest interferes with the acquisition of a SAR image.

A few assumptions are made for the operation of this invention, as shown in FIG. 2. The nominal flight path of the moving platform (flying aircraft) during the SAR array (frame) is in a straight line parallel to the centerline of the scene being acquired, where the scene is flat. Aircraft ideal track is a straight line in a plane parallel to the flight track, as shown in FIG. 2. Aircraft 202 is following flight path 204 in the x direction, at an altitude h above flat area 200 and acquiring SAR image of scene 206. Scene 206 has a centerline 208, where centerline 208 is parallel to flight path 204. In FIG. 2, and used in this invention, x direction is the direction of flight.

y direction is perpendicular to x, parallel to the plane of the scene being imaged.

z direction is normal to the plane of the scene, defined by $\hat{z}=\hat{x}\times\hat{y}$ FIG. 3 shows a moving radar receiver 300 having a plurality of apertures 315, 317 for acquiring concurrent synthetic aperture images of a target 313 on a surface 309. Surface 309 is defined as in FIG. 2 in the x, y plane. The target 313 is obscured by non-stationary clutter reflected from, for example, wind blown vegetation or trees 301, 303 and 305 located at a height H1 above surface 309. Height H1 is in the z direction. The radar receiver 300 digitizes radar returns in each sub-aperture reflected from a combination of target 313 on surface 309, and from the non-stationary clutter reflected from wind blown vegetation. The radar has a radar beam (not shown) for concurrently and non-selectively illuminating surface 309 and elevated clutter 301, 303 and 305.

Figure 4:
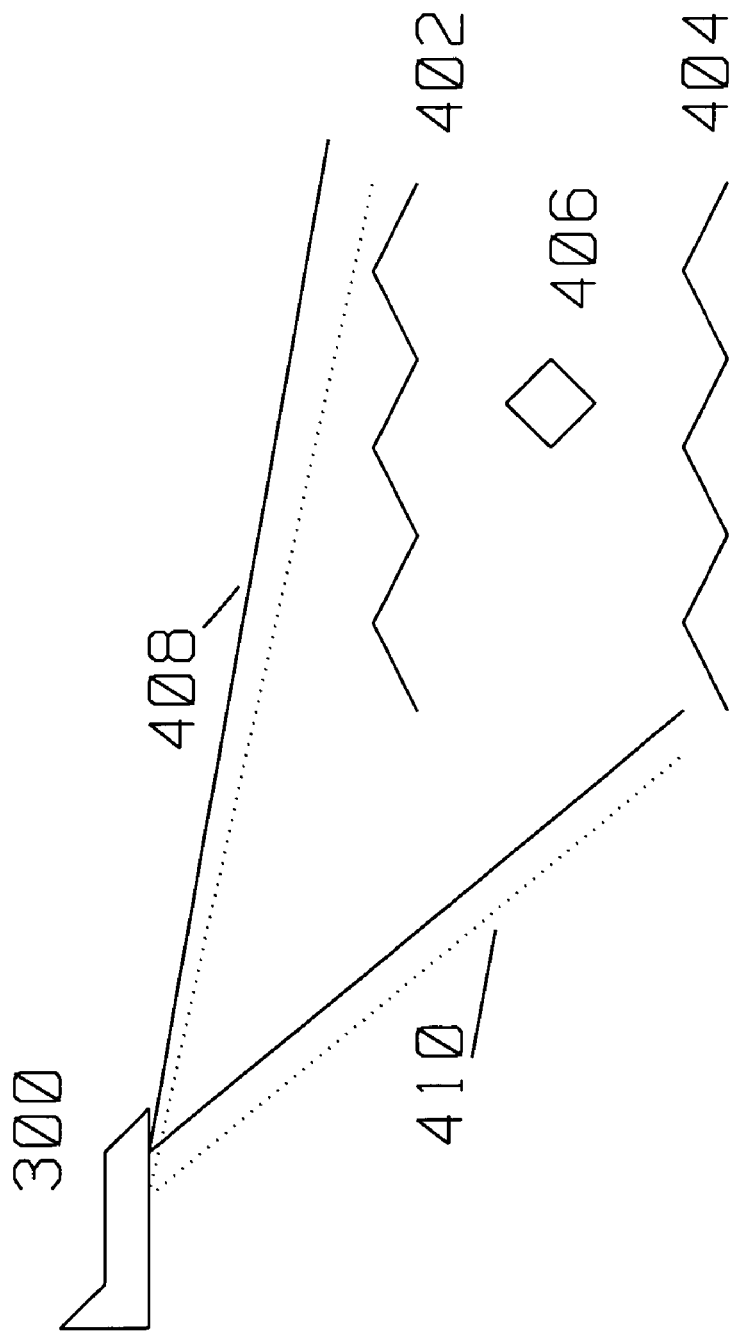
FIG. 4 shows a typical scene to be imaged in a marine environment where ocean waves and surf generate non-stationary clutter interfere with the acquisition of a SAR image.

Similarly, in FIG. 4, non-stationary clutter is generated from waves and surf in a maritime environment. Here, the same moving radar receiver 300 acquires radar returns reflected from illuminating both target 406 and sea waves 402 and 404. The radar returns from target 406 are combined within the same range bin with those from the waves, whereby the clutter presented objects such as waves 402 and 404 obscures the return from target 406. Radar receiver 300 has a plurality of apertures such as 408 and 410 for acquiring concurrent synthetic aperture images of target 406 in the proximity of clutter 402 and 404.

Figure 5:
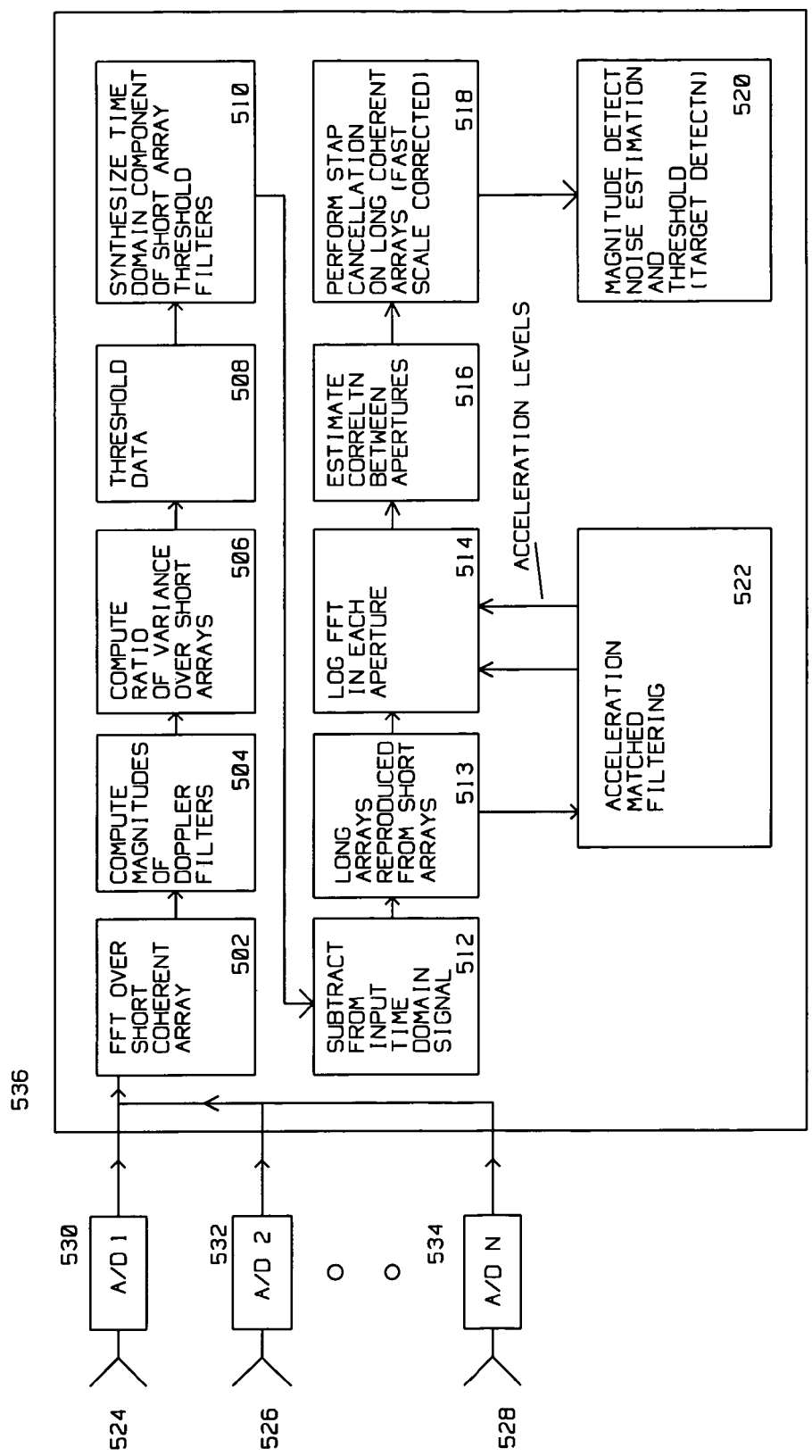
FIG. 5 is a flow diagram of the present invention for canceling non-stationary clutter from a SAR image where the effect of clutter is reduced using the principles of this invention.

The effect of clutter as described in FIG. 3 and FIG. 4 is reduced by a radar receiver performing the functions of FIG. 5, where the fast varying clutter components are first extracted and then rejected from the radar returns within each subaperture. The resulting fast clutter free data for a plurality of subapertures is then optimally combined to reject slow varying, stationary clutter (e.g. ground clutter, slow sea clutter), thus isolating the target for detection or imaging. In effect, the radar data received from the target and clutter is divided into two time scales, a fast time scale and a slow time scale, thereby allowing for effective rejection of the fast and slow (stationary) clutter components.

Radar receiver 300 of FIGS. 3 and 4 has a plurality of subapertures. For the data concurrently acquired from each subaperture, a fast scale part of the solution is obtained by integrating the returns over short, e.g. 10 to 400 millisecond overlapping coherent arrays within each subaperture. The arrays overlap over the target of interest, as do the subapertures. The 10 millisecond range of overlapping coherent arrays are used for maritime applications, while the longer 100 to 400 millisecond range is used to reduce wind swept vegetation clutter in accordance with this invention.

FIG. 5 shows a radar receiver on a moving platform for detecting a target such as 313 in FIG. 3, and/or 406 in FIG. 4, using a plurality of short coherent arrays and a plurality of long coherent arrays synthesized from said short coherent arrays, said plurality of short coherent arrays and said plurality of long coherent arrays overlapping over said target, said target obscured by a slow scale clutter and a fast scale clutter in the vicinity of said target.

The radar receiver comprises a plurality of subapertures 524, 526 . . . 528, each of the subapertures having receive patterns such as pairs 315 and 317, and/or 408 and 410. The receive patterns (e.g. 408 and 410) are overlapping to acquire radar returns reflected from the target during said plurality of short coherent arrays. The target is obscured by the slow scale clutter and the fast scale clutter during said plurality of short coherent arrays.

Analog to digital converters 530, 532, . . . 534 are provided for each of the subapertures 524, 526, . . . 528 to convert the analog radar returns into digital radar returns for a plurality of range bins. The range bins cover the target and the slow scale clutter and fast scale clutter during said plurality of short coherent arrays.

Digital computer 536 performs the computing steps to detect a target in the presence of slow scale and fast scale clutter.

The first operation in computer 536 is motion compensating said digital radar returns derived from each of said plurality of subapertures 524, 526, 528 during said plurality of short coherent arrays for said plurality of range bins, with respect to said target, to obtain a plurality of short array focused data of said target obscured by said slow scale clutter and said fast scale clutter.

The digital radar returns are stored within computer 536 for the plurality of short array focused data for each of said subapertures. This storage facilitates integrating said short array focused data and performing an FFT (Fast Fourier Transform) within FFT On Short Coherent Array 502 for each of said subapertures over said plurality of short array focused data to obtain short array integrated data for each range bin of said plurality of range bins. The FFT generates the equivalent of frequency (Doppler) filters.

The magnitude of the complex results from the FFT is computed in Compute Magnitude of Doppler Filters 504 and is performed for each range bin of said plurality of range bins from said short array integrated data to obtain short array magnitude data.

From the short array magnitude data a threshold is computed below which the data is set to zero in Compute Ratio of Variance Over Short Arrays 506. A threshold is computed from the ratio of the variance over the short array. For example, the threshold is set to 1 sigma. If so, any short array magnitude data below the 1 sigma level is set to zero.

In one embodiment, said threshold is computed using a short array variance of said short array magnitude data. That is, the variance over a plurality of short arrays is computed, then the threshold is set to at a one sigma, or two sigma level, or another convenient level relative to the whole image, depending on how noisy the data is.

Thresholding is performed in Threshold Data 508 by comparing the short array magnitude data with a threshold set for each range bin of said plurality of range bins. Here, the short array magnitude data for each range bin of said plurality of range bins below said threshold is set to zero to obtain thresholded data.

A time domain component of threshold filters is computed in Synthesize Time Domain Component of Short Array Threshold Filters 510 using said thresholded data for each range bin of said plurality of range bins. This generates a time domain signal that is compatible with the short array focused data and is representative of the fast scale clutter present in various range bins.

The time domain component of threshold filters generated in 510 is coherently subtracted from the short array integrated data to obtain a fast scale clutter corrected data in Subtract From Input Time Domain Signal 512.

The resultant fast scale clutter corrected data, now containing stationary and varying clutter only, is reproduced over the long coherent arrays to obtain fast scale clutter corrected data in Long Arrays Reproduced From Short Arrays 513.

For applications where targets to be detected are under wind blown foliage, fast scale clutter corrected data is processed in Acceleration Matched Filtering 522. The process here is described in U.S. Pat. No. 5,113,194, issued May 12, 1992 to Krikorian at al., incorporated herein in its entirety. The output from Acceleration Matched Filtering 522, including acceleration levels, is presented to LOG FFT In Each Aperture 514 for computing a compression, LOG FFT.

For applications where maritime fast clutter is encountered from surf or small waves, Acceleration Matched Filtering 522 may not be necessary, and the fast scale clutter corrected data is presented to LOG FFT In Each Aperture 514 for compression, LOG FFT.

The LOG FFT from 514 is used in Estimate Correlation Between Apertures 516 to prepare compressed data for the Space Time Adaptive Algorithm (STAP). The compressed data, representative of the long arrays, is optimally combined in Perform STAP cancellation on Long Arrays (Fast Scale Corrected) 518 where the stationary ground and slowly varying clutter is canceled to allow endoclutter detection of slow targets.

Endoclutter detection of target is performed in Magnitude Detect, Noise Estimation and Threshold (Target Detection) 520 using the output from and following STAP (slow) clutter cancellation.

The short coherent arrays are between 10 and 400 milliseconds long, while long coherent arrays synthesized from a plurality of fast scale clutter corrected data are between 400 and 4000 milliseconds long.

All references cited in this document are incorporated herein in their entirety by reference. Specifically, *Synthetic Aperture Radar* by John J Kovaly, ISBN 0-89006-056-8, Artech House, and *Radar Technology* by Eli Brookner, ISBN 0 89006 0215, Artech House, are incorporated herein in their entirety by reference to provide a background for this invention and definition of variables used herein.

Although presented in exemplary fashion employing specific embodiments, the disclosed structures are not intended to be so limited. For example, while specific methods for computing a threshold have been outlined, others are also applicable. The objective is to eliminate extraneous, noise induced data from interfering with the STAP cancellation and subsequent target detection.

Those skilled in the art will also appreciate that numerous changes and modifications could be made to the embodiment described herein without departing in any way from the invention.

What is claimed is:

1. A radar receiver on a moving platform for detecting a target using a plurality of short coherent arrays and a plurality of long coherent arrays synthesized from said short coherent arrays, said plurality of short coherent arrays and said plurality of long coherent arrays overlapping over said target, said target obscured by a slow scale clutter and a fast scale clutter in the vicinity of said target, said radar receiver comprising:

a plurality of subapertures, each of said subapertures having receive patterns, said receive patterns overlapping to acquire radar returns reflected from said target during said plurality of short coherent arrays, said target obscured by said slow scale clutter and said fast scale clutter during said plurality of short coherent arrays;

an analog to digital converter for each of said subapertures to convert said radar returns into digital radar returns for a plurality of range bins, said range bins covering said target and said slow scale clutter and fast scale clutter during said plurality of short coherent arrays;

a digital computer for performing the steps of:

motion compensating said digital radar returns derived from each of said plurality of subapertures during said plurality of short coherent arrays for said plurality of range bins, with respect to said target, to obtain a plurality of short array focused data of said target obscured by said slow scale clutter and said fast scale clutter, for each of said subapertures;

integrating said short array focused data for each of said subapertures over said plurality of short array focused data to obtain short array integrated data for each range bin of said plurality of range bins;

computing magnitude of Doppler filters for each range bin of said plurality of range bins from said short array integrated data to obtain short array magnitude data;

comparing said short array magnitude data with a threshold for each range bin of said plurality of range bins, and setting said short array magnitude data for said range bins for each range bin of said plurality of range bins below said threshold to zero to obtain thresholded data;

computing a time domain component of threshold filters using said thresholded data for each range bin of said plurality of range bins;

coherently subtracting said time domain component of threshold filters from said short array integrated data to obtain a fast scale clutter corrected data.

2. A radar receiver as described in claim 1 wherein said fast scale clutter corrected data is synthesized to form said long coherent arrays to obtain fast scale corrected data.

3. A radar receiver as described in claim 2 wherein a Space Time Adaptive Algorithm (STAP) is applied to compressed data extracted from said fast scale corrected data.

4. A radar receiver as described in claim 3 wherein said threshold is computed using a short array variance of said short array magnitude data.

5. A radar receiver as described in claim 4 wherein said fast scale clutter corrected data is processed using acceleration matched filtering for use in said Space Time Adaptive Algorithm (STAP).

6. A radar receiver as described in claim 5 wherein said short coherent arrays are between 10 and 400 milliseconds long.

7. A radar receiver as described in claim 6 wherein said long coherent arrays synthesized from a plurality of fast scale clutter corrected data are between 400 and 4000 milliseconds long.

8. A method for operating a radar receiver on a moving platform for detecting a target using a plurality of short coherent arrays and a plurality of long coherent arrays synthesized from said short coherent arrays, said plurality of short coherent arrays and said plurality of long coherent arrays overlapping over said target, said target obscured by a slow scale clutter and a fast scale clutter in the vicinity of said target, said method comprising the steps of:

overlapping receive patterns of a plurality of subapertures, to acquire radar returns reflected from said target during said plurality of short coherent arrays, said target obscured by said slow scale clutter and said fast scale clutter during said plurality of short coherent arrays;

converting said radar returns for each of said subapertures into digital radar returns for a plurality of range bins, said range bins covering said target and said slow scale clutter and fast scale clutter during said plurality of short coherent arrays;

motion compensating said digital radar returns derived from each of said plurality of subapertures during said plurality of short coherent arrays for said plurality of range bins, with respect to said target, to obtain a plurality of short array focused data of said target obscured by said slow scale clutter and said fast scale clutter, for each of said subapertures;

integrating said short array focused data for each of said subapertures over said plurality of short array focused data to obtain short array integrated data for each range bin of said plurality of range bins;

computing magnitude of Doppler filters for each range bin of said plurality of range bins from said short array integrated data to obtain short array magnitude data;

comparing said short array magnitude data with a threshold for each range bin of said plurality of range bins, and setting said short array magnitude data for said range bins for each range bin of said plurality of range bins below said threshold to zero to obtain thresholded data;

computing a time domain component of threshold filters using said thresholded data for each range bin of said plurality of range bins;

coherently subtracting said time domain component of threshold filters from said short array integrated data to obtain a fast scale clutter corrected data.

9. A method as described in claim 8 wherein said fast scale clutter corrected data is synthesized to form said long coherent arrays to obtain fast scale corrected data.

10. A method as described in claim 9 wherein a Space Time Adaptive Algorithm (STAP) is applied to compressed data extracted from said fast scale corrected data.

11. A method as described in claim 10 wherein said threshold is computed using a short array variance of said short array magnitude data.

12. A method as described in claim 11 wherein said fast scale corrected data is processed using acceleration matched filtering for use in said Space Time Adaptive Algorithm (STAP).

13. A method as described in claim 12 wherein said short coherent arrays are between 10 and 400 milliseconds long.

14. A method as described in claim 13 wherein said long coherent arrays synthesized from a plurality of fast scale clutter corrected data are between 400 and 4000 milliseconds long.

* * * * *